United States Patent [19]
Saer et al.

[11] 4,382,161
[45] May 3, 1983

[54] CLIP-ON ELECTRONIC SWITCHING AND HOLD DEVICES FOR TELEPHONES

[76] Inventors: George A. Saer, 2251 Montgomery Ave.; Jeffrey D. Stein, 1303 Belleview, both of Cardiff-by-the-Sea, Calif. 92009

[21] Appl. No.: 228,397

[22] Filed: Jan. 26, 1981

Related U.S. Application Data

[63] Continuation-in-part of Ser. No. 129,387, Mar. 11, 1980.

[51] Int. Cl.³ .................... H01H 3/04; H01H 21/80; H04M 1/06; H04M 1/21
[52] U.S. Cl. ............................... 179/81 C; 179/178; 200/335
[58] Field of Search ............... 179/2 TC, 81 R, 81 C, 179/99 H, 100 D, 146 R, 158 R, 159, 160, 164, 178, 179, 189 R; 200/314, 335

[56] References Cited
U.S. PATENT DOCUMENTS

| | | | |
|---|---|---|---|
| 2,558,661 | 6/1951 | Murray | 179/178 |
| 3,165,597 | 1/1965 | Nordstroöm et al. | 179/164 |
| 4,136,270 | 1/1979 | Wernet et al. | 200/340 |
| 4,258,232 | 3/1981 | Smith et al. | 179/99 R |
| 4,268,726 | 5/1981 | Chu | 179/164 |

FOREIGN PATENT DOCUMENTS

| | | | |
|---|---|---|---|
| 1496640 | 12/1977 | United Kingdom | 200/314 |

*Primary Examiner*—Thomas W. Brown
*Attorney, Agent, or Firm*—Fischer, Tachner & Strauss

[57] ABSTRACT

In a first preferred embodiment of the invention, a clip-on switching device is disclosed to prevent the placing of unauthorized outgoing calls from a (Touch Tone) telephone and/or to selectively switch an incoming call to an accessory (extension) telephone circuit. The switching device includes a housing which is particularly shaped to conform to the contour of the telephone cradle so as to be releasably connected therewithin. Positioned within the housing is a card having a control circuit thereon for selectively controlling the telephone circuitry. A unique spring-biased light emitting diode push-button switch is associated with the instant switching device, whereby to provide a visible signal, so as to indicate the operation of the telephone control circuit. In a second preferred embodiment of the invention, a telephone circuit hold device is provided which can be releasably connected to a (Touch Tone) telephone to permit the recipient of an incoming call to return his telephone handset to the telephone cradle whereby to temporarily place the existing call in a hold condition. The hold device includes an actuator assembly which is particularly structured for movement into physical contact with an associated circuit of the hold device, to selectively activate said circuit in order to place the telephone circuits in the hold condition.

12 Claims, 12 Drawing Figures

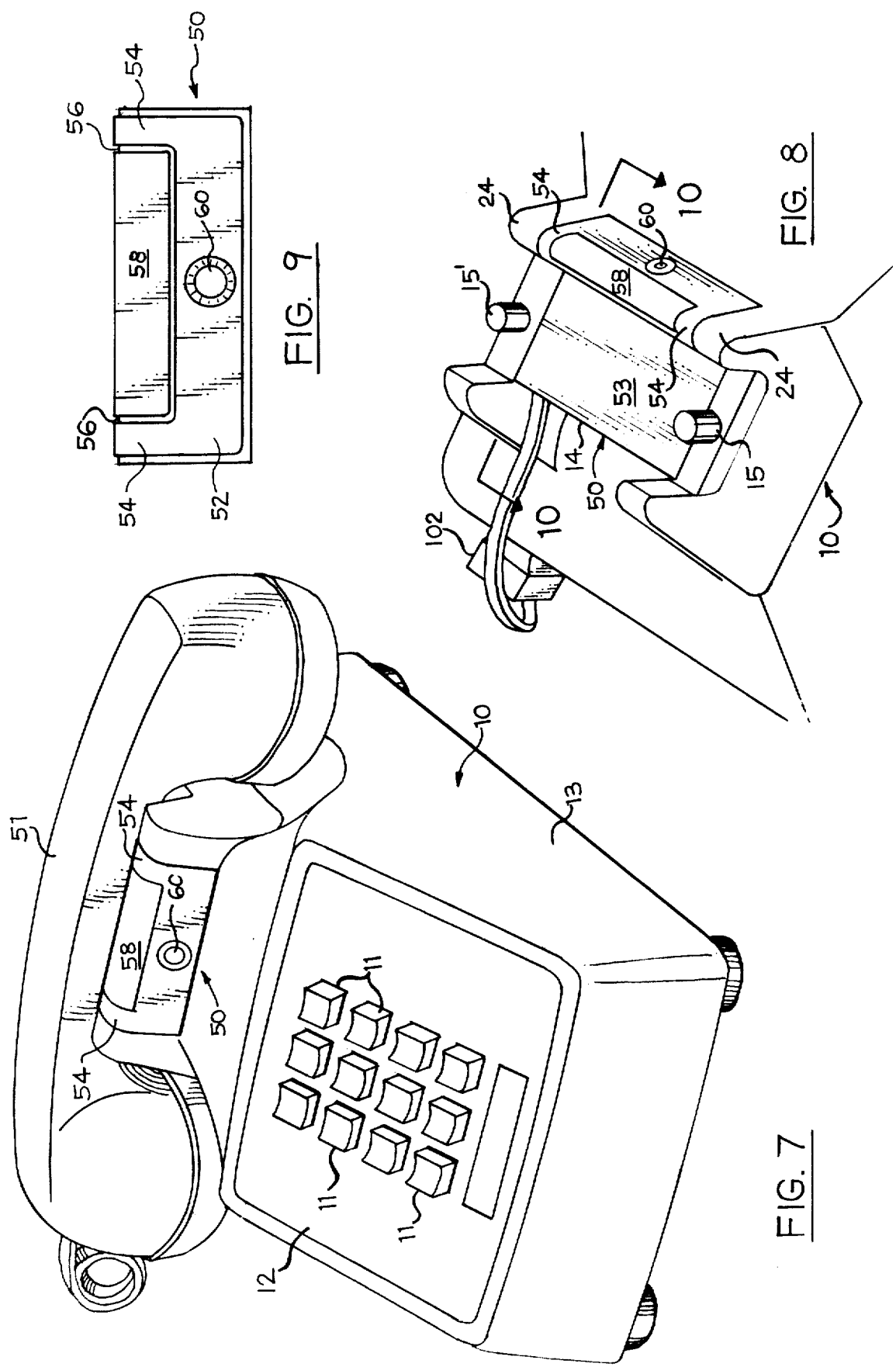

TO TELEPHONE CIRCUITS

CLIP-ON ELECTRONIC SWITCHING AND HOLD DEVICES FOR TELEPHONES

CROSS REFERENCE TO RELATED PATENT APPLICATIONS

This patent application is a Continuation-In-Part of co-pending U.S. patent application Ser. No. 129,387 filed Mar. 11, 1980.

BACKGROUND OF THE INVENTION

This invention is directed to telephones and more particularly, to rotary dial or push-button (i.e. Touch Tone) types which complete a call by making desired connections at a telephone company central office. For purposes of illustration, a push-button telephone will be referred to. However, the comments relate as well to a rotary (dial) type. Therefore, reference made to a Touch Tone telephone are not to be considered as a limitation of the present invention. With regard to the push-button or Touch Tone type, by selectively pressing and releasing a numbered sequence of plungers on a numerical face plate on a telephone, a plurality of different tones or frequencies are respectively generated on the subscriber's line, the number called depending upon the tones created by the various plungers depressed and released. The electrical tone or frequencies thus generated are transmitted to the central office where they control the movement of an electro-mechanical device called a selector through which the subscriber's line is connected to other selective mechanisms. Each successive digit formed by the plungers produces another series of such tones which advance the call one step toward completion until the final operation occurs whereby connection is made to the called telephone.

The use of Touch Tone push-button telephones is being gradually extended in this country and in all parts of the world. Additionally, the Touch Tone telephones are so preferred that toll calls can be made directly by the caller or subscriber through new central station equipment. However, the subscriber may not authorize the caller to make such toll or local calls and thus he is charged for calls he knows nothing about.

Further, it is desirable to utilize the telephone to control incoming calls so that they can be switched to other necessary circuits if desired.

What is more, the telephone user may frequently receive an incoming call at an inconvenient time. That is, and by way of a first example, the user may desire to communicate with a caller at a more suitable (i.e. comfortable) place, where a telephone accessory (i.e. extension) circuit is located. By way of a second example, an incoming telephone call may find the recipient temporarily occupied with a task, such as cooking, or the like. In both of the aforementioned cases, it would be desirable that the user have access to an inexpensive and compact device by which to place his telephone in a hold condition so as to permit him to return the telephone handset to its associated cradle without disconnecting an existing call. In this way the user can have the time necessary to either complete his task or move to the more suitable location of a telephone extension before resuming his conversation. Moreover, and in the event that the user wishes to complete the conversation from a remote telephone extension, it would be advantageous for the user to first be able to return the original telephone handset to its cradle without later seeking the assistance of an additional person.

DESCRIPTION OF THE PRIOR ART

Although devices for telephones have been known for controlling incoming and outgoing calls, none have been easily installed on a telephone in a clip-on manner which also is adaptable to provide a switching function.

U.S. Design Pat. No. 230,737 discloses an add-on device for locking Touch Tone telephones.

SUMMARY OF THE INVENTION

In accordance with a first preferred embodiment of the present invention, an improved switching mechanism is provided which interlocks with a cavity in the present day telephones.

A further object of this invention is to provide an improved switching mechanism for telephones which may be readily attached to present telephones with a minimum of connections.

A still further object of this invention is to provide a simple housing for encasing a switching mechanism for fitting into a cavity of a telephone which is economical to manufacture and install.

In accordance with a second preferred embodiment of the claimed invention, a modular telephone circuit hold device is provided which can be interfaced with a telephone in order to permit the recipient of an incoming call to return his telephone handset to the telephone cradle and thereby place the telephone in a hold condition, without disconnecting the existing call.

Therefore, it is yet another object of this invention to provide a compact and relatively inexpensive telephone hold device that can be easily and releasably connected to a user's telephone.

It is still an additional object of this invention that the disclosed hold device have a means by which to provide a visible indication whenever the user's telephone circuits are in the hold condition.

It is a further object of this invention that the disclosed hold device have a unique actuator assembly which permits the telephone user to selectively activate a circuit associated with the hold device for placing his telephone in the hold condition.

It is still a further object of this invention that the actuator assembly of the disclosed hold device be particularly structured so as to be adapted for movement into physical contact with a component of the hold device circuit for selectively activating said circuit.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawings in which:

FIG. 7 is a front perspective view of a Touch Tone telephone having the modular hold device of the present invention mounted in its cradle cavity;

FIG. 8 is a partial top perspective view showing the telephone and hold device of FIG. 7;

FIG. 9 is a front view of the modular hold device which forms the present invention;

DESCRIPTION OF THE PREFERRED EMBODIMENT

Figure 1:
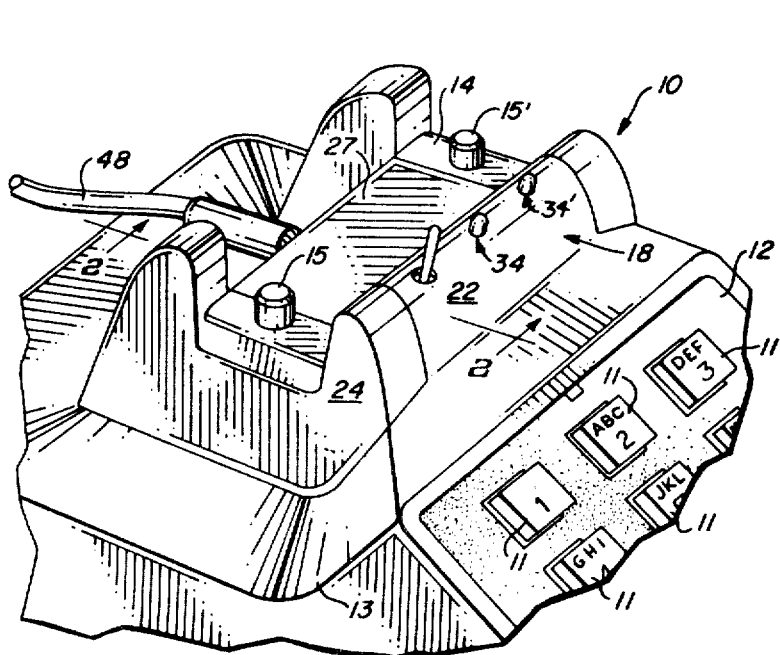
FIG. 1 is a partial perspective view of a Touch Tone telephone with the clip-on switching device mounted in its cradle cavity.

Referring more particularly to the drawing by characters of reference, FIGS. 1-4 illustrate a Touch Tone-type telephone 10 comprising the usual and well-known transmitter and receiver of electrical impulses and converter of such impulses into audio sounds. Since telephone 10 is well-known, it will not be described further except to note that the telephone has an electrical circuit interconnecting a source of power to the Touch Tone button-type plungers 11 mounted on the face 12 of housing 13 of the telephone which can be interrupted by one or more on/off switches, if so desired, to control the transmission of electrical pulses from the telephone to a central station for transmission to other like telephones.

Although the telephone 10 does not have a handset shown, such part of the telephone would be used and placed in the cradle 14 of housing 13 in a well-known manner. The push-buttons 15, 15' when depressed by the handset (not shown) position the telephone circuits in a condition for receiving incoming calls. In their upward positions shown, which they assume when the handset is out of the cradle, they condition the circuits in the telephone for transmitting outwardly of the telephone and complete circuits for receiving and transmitting impulses convertible to audio sounds.

Figure 2:
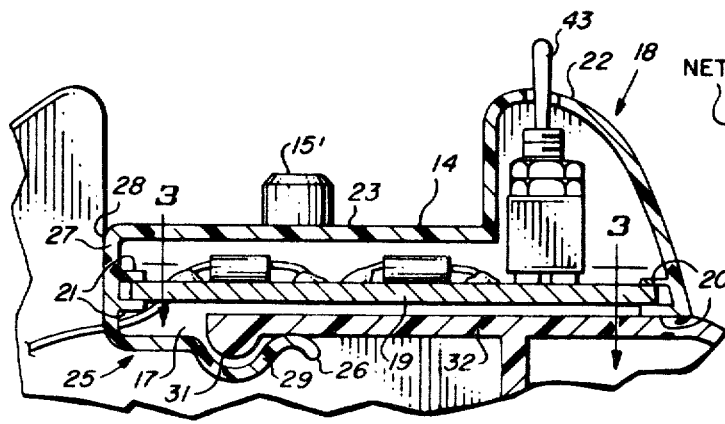
FIG. 2 is a cross-sectional view of FIG. 1 taken along the line 2—2.

In order to provide selective accessory connection with a given telephone 10, a new clip-on switching device 16 is interconnected with telephone 10 at the existing cradle 14 formed in the telephone housing 13, as shown in FIGS. 1 and 2 of the drawings.

The clip-on electronic switching device comprises a housing 18 formed of a suitable plastic or like moldable material which at least partially encloses the electronic switching device and employs suitable logic for accomplishing the switching functions disclosed.

As shown in FIG. 2, a selector switching card 19 employing the logic for the various switching function hereinafter explained comprises a flat card shown also in FIG. 3 which is mounted in the base of the housing between pairs of cooperating ridges 20 and 21 at opposite ends of housing 18. Housing 18 comprises a shell-like hollow configuration having a ridged end 22 projecting upwardly from a relatively flat top surface 23. The ridged end 22 is conformed to fit between and complete the shape of projections 24 forming a part of cradle 14. At the end of surface 23 of housing 18 opposite to its ridged end 22, the housing is provided with a clip configuration 25. This clip configuration comprises a leg member 26 forming a part of the extended surface 27 of end 28 of housing 18 which is reverse bent to extend juxta-positioned to and spaced from the bottom surface of switching card 19 in the manner shown in FIGS. 2 and 6. The leg member 26 of clip configuration 25 is provided with a distortion or groove 29. Groove 29 extends across at least a part of the width of clip configuration 25 and partially surrounds and interlocks with a bend or protrusion 31 formed on a ledge 32. Ledge 32 projects into a cavity 17 that is formed below the cradle 14 of telephone 10. Thus, the clip configuration of housing 18 can be moved longitudinally into cavity 17 of housing 13 to detachable connect housing 18 to housing 13 in such an arrangement that the surface 27 of housing 18 forms substantially an extension of the outer surface or contour of projection 24 of housing 13.

As shown in FIG. 2, the bottom of switching card 19 is mounted flush to the bottom of the cradle for the telephone and is kept in place by spring tension created by the memory of the plastic material from which housing 18 and particularly leg member 26 are formed.

It should be noted that housing 18 of the clip-on device 16 is intended to provide a plurality of discrete functions depending on the electronic gear and logic mounted on the switching card 19 or modifications thereof.

Figure 6:
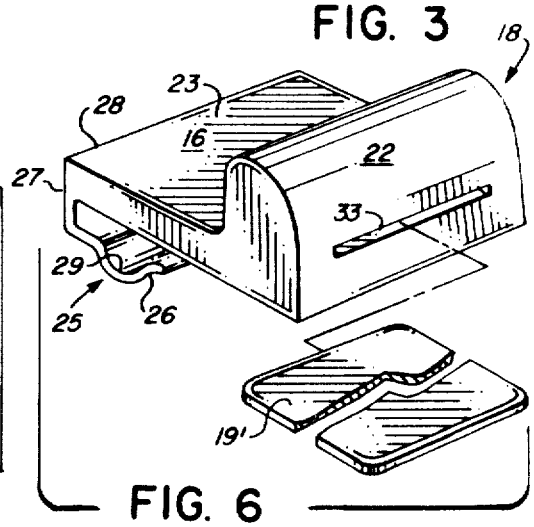
FIG. 6 is an exploded perspective view of a modification of the clip-on device shown in FIG. 1 employing an insertable logic controlling card.

As shown in FIG. 6, housing 18 of the clip-on device 16 is modified to receive a logic bearing card 19' through a slot 33 formed in the ridged end 22 of the housing. This card is intended to guard the telephone against unauthorized use. Moreover, card 19' may function to disconnect the telephone or its associated bell from the central telephone office by movement of card 19' into and out of slot 33. A pair of lead wires, not shown in FIG. 6, connect the plungers 11 to the telephone circuitry through a circuit on the switch card 19' when the card is in the slot 33 of housing 18 and is broken when the card is removed from slot 33 in housing 18.

It should be noted when the clip-on device of FIG. 6 is utilized, card 19, shown in FIG. 2, does not comprise a part of the structure.

With regard to card 19 and its function in housing 18, this card may provide the discrete function of enabling the receiver of a call on a single line telephone to place the caller "on hold" and to switch the caller onto an extension of this single line telephone. To operate the telephone to accomplish this option, the called party having the clip-on device installed on his telephone merely depresses a unique light emitting diode (LED) push-button switch 34' as he hangs up his telephone handset. This LED push-button switch 34 or 34' illuminates to indicate that the holding circuit is engaged and will extinguish when any extension is picked up. Another device which permits the caller to be placed "on hold" is disclosed when referring to FIGS. 7-12 of the drawings.

Figure 5:
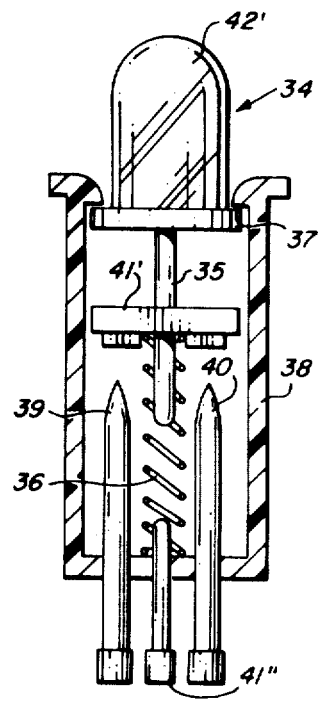
FIG. 5 is a cross-sectional view of one of the switches shown in FIG. 1.
Figure 3:
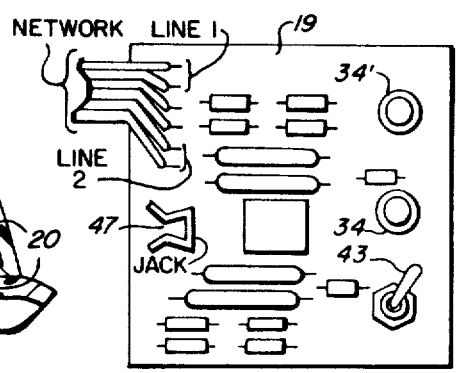
FIG. 3 is a diagrammatic top view of the logic card shown in FIG. 2.

FIG. 5 is a cross-sectional view of one of the push-button switches 34, 34' shown in FIGS. 1 and 3. Each push-button switch comprises a plunger 41' employing a pair of juxtapositioned rods serving as conductors 35, only one of which being shown. Conductor rods 35 are spring biased with the plunger 41' to the circuit open position shown in the drawing against an internal ledge 37 of its housing 38 by a pair of coil springs 36, only one of which being shown. A pair of contacts 39 and 40 are interconnected by a bridging member forming a part of plunger 41' when plunger 41' is depressed against the bias of spring 36, only one of which being shown. Dome 42' of the LED switch is illuminated after plunger 41' is depressed and the handset is returned to the telephone cradle. Accordingly, the bridging member of plunger 41' makes contact with contacts 39 and 40. Coil springs 36 serve as conductors for interconnecting conductors 35 and 41" of each of the LED switches 34, 34' in the manner shown in FIG. 4.

Figure 4:
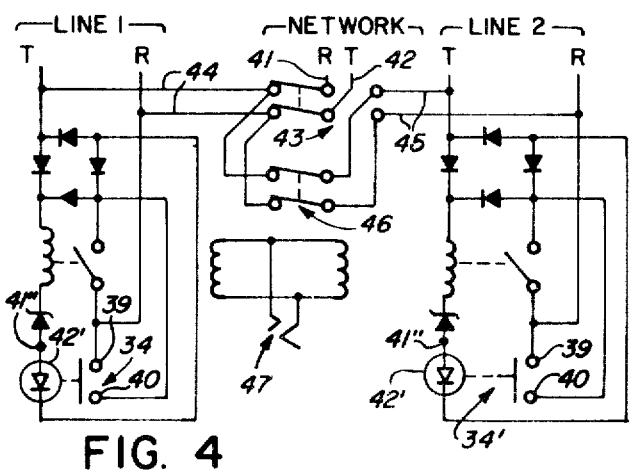
FIG. 4 is a circuit diagram of the logic shown in FIG. 3.

FIG. 4 illustrates that the network system of the telephone is connected to the telephone company's circuit (not shown) through lines 41 and 42, respectively. A double throw toggle switch 43 connected to the network system connects the network to either line 1 or line 2 depending on the line selected by the user of the telephone set through circuits 44 and 45, respectively.

It should be noted that the logic shown for the lines 1 and 2 are identical but they could be different if so desired. The second hold line is connectable to either an outside line or an inside intercom line through one position of a two position toggle switch 43. In order to establish a three party conference call, line 1 can be connected to line 2 and to the telephone network through lines 41 and 42 by means of a second two position toggle switch 46. The remaining logic for line 2 comprises similar logic components as in line 1 including the push-button switch 34'.

An optional 3.5 mm jack 47 is installed in the rear of the clip-on device 16, as shown in FIGS. 1, 3 and 4, for providing a means for connecting through cable 48 a radio or cassette player (not shown) into the clip-on device for providing music to the caller when he or she is temporarily placed "on hold".

Although the logic for accomplishing the various switching functions of the clip-on device 16 are well-known functions, it is believed to be novel to accomplish these discrete functions by the disclosed simple but efficient clip-on device which fits into the cradle of a telephone and requires a minimum of changes or interruptions to the normal telephone's connection to the telephone network.

When the clip-on device is modified, as shown in FIG. 6, the card 19' merely comprises a switching function to either complete the telephone network connection to the telephone circuits when the card is inserted in the housing 18 or to interrupt the circuitry when the card is removed from slot 33 in housing 18.

The modular telephone circuit hold device 50 which forms a second preferred embodiment of the present invention is disclosed in detail while referring concurrently to FIGS. 7-9 of the drawings. The telephone circuit hold device 50 is particularly adapted to be interfaced (e.g. by means of a readily available telephone adapter 102) with the circuits of a conventional Touch Tone-type telephone 10, such as that which was described above while referring to FIG. 1. Accordingly, and for the purpose of convenience in better understanding the present embodiment, only a brief description of telephone 10 will again be presented. The Touch Tone telephone 10 includes an array of push-buttons 11 mounted on the face 12 of telephone housing 13. As will be known to those skilled in the art, the activation of any push button 11 results in the generation of a respective audible tone having a particular predetermined frequency. As is best shown in FIG. 7, the telephone 10 also includes a well-known handset 51 that is adapted to be received in the cradle 14 formed atop the telephone housing 13. When placed in the cradle 14 the handset 51 is positioned to depress reciprocating plungers 15 and 15', whereby to clear the telephone circuits and condition telephone 10 to receive incoming calls.

The telephone circuit hold device 50 of the present invention provides a compact and relatively inexpensive means for conveniently maintaining the telephone circuits in a hold condition after the handset 51 has been returned to cradle 14. Therefore, and by virtue of the present invention, the plungers 15, 15' of telephone 10 can be depressed without breaking the telephone circuit and undesirably disconnecting an existing caller. As will be explained hereinafter, the telephone user is subsequently able to continue his conversation with the existing caller from either an extension phone or the original telephone 10.

The telephone circuit hold device 50 has a housing 52 comprising a shell of hollow configuration. Housing 52 is preferably fabricated from a molded plastic material, such as, for example, an ABS thermoplastic. Projecting upwardly from one end of a flat top surface of housing 52 and forming a rising extension of the front face of housing 52 is a pair of ridged housing ends 54. The ridged ends 54 are shaped to fit between and conform to the configuration of a corresponding pair of projections 24 which rise upwardly from the front of the telephone cradle 14. A generally rectangular opening 56 is established through the top of housing 52 between the pair of ridged ends 54. A hold circuit actuator assembly 58 is located within housing 52, so that a top curved surface thereof extends into opening 56 and lies flush with the pair of ridged ends 54. Actuator assembly 58 is dimensioned so that, in the assembled relationship, a raised surface of generally uniform contour is created by telephone projections 24, ridged edges 54 and the top of actuator assembly 58. As will be disclosed in greater detail hereinafter when referring to FIGS. 10 and 11, the actuator assembly 58 is particularly structured to activate the circuitry of hold device 50, whereby to place the telephone circuits in a hold condition, so that the telephone handset 51 can be replaced in cradle 14 without interrupting an existing call.

A small aperture is established through the front face of housing 52 below the opening 56 in which is located the top of assembly 58. The dome of a tubular light emitting diode 60 extends outwardly from the aperture in the face of housing 52, so as to be readily visible to the telephone user. As will also be disclosed in greater detail when referring to FIG. 12, the light emitting diode 60 becomes energized when the hold circuit of device 50 is activated, so as to provide a luminous signal to the telephone user, whereby to indicate that the telephone circuits are being rendered in a hold condition.

Figure 10:
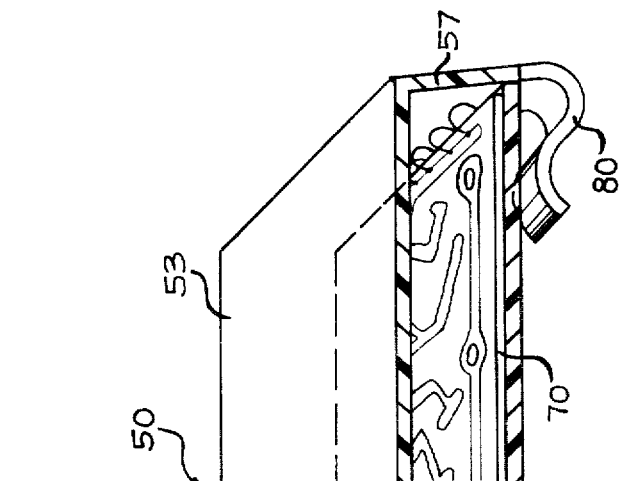
FIG. 10 is a cross-sectional view taken along lines 10—10 of FIG. 8.

Referring now to FIG. 10 of the drawings, the actuator assembly 58 which forms an important part of the present telephone circuit hold device 50 is disclosed in detail. Preferably, actuator assembly 58 is integrally constructed from a suitable plastic material, such as, for example, a thermoplastic resin. Actuator assembly 58 includes an elongated body portion having a curved upper surface, a flat bottom surface, and flat side surfaces. The curved upper or exterior surface of actuator assembly 58 comprises a push bar 62. As was previously disclosed, push bar surface 62 is shaped to fit within a rectangular opening established in housing 52, so as to be aligned flush with the above-identified pair of ridged ends 54. The body of actuator assembly 58 cooperates with a lower and upper lip 59 and 59', which lips define two elongated peripheral edges of the rectangular opening through housing 52.

An elongated flange member 64 is formed coextensively with the body portion of actuator assembly 58 along the front of the bottom surface thereof. A pair of legs 66 are also formed coextensively with the body portion of actuator assembly 58 at the back of the bottom surface thereof. A generally rectangular retainer or stop member 68 extends lengthwise at each side of the body portion of actuator assembly 58 between the curved top and flat bottom surfaces thereof. Each stop member 68 is preferably tapered, so as to form a raised protrusion near the curved push bar surface 62 of actuator assembly 58. In the assembled relationship, the raised protrusions of stop members 68 function, in part, as a means by which to retain actuator assembly 58 within the housing 52 of hold device 50. That is, the top of each stop member 68 is dimensioned so as to conform to the shape of a ridged end 54. The raised protrusions of stop members 68 are thereby shaped to be received by and make contact with the undersides of respective ridged ends 54 in the event that removal of actuator assembly 58 is attempted through the opening established in housing 52. Thus, stop members 68 prohibit the accidental or unauthorized removal of actuator assembly 58 by blocking the egress thereof at ridged ends 54.

Actuator assembly 58 is positioned within the housing 52 of telephone circuit hold device 50, as follows. As was previously disclosed when referring to FIGS. 7-9, the top of housing 52 includes a relatively flat surface 53 and a pair of ridged ends 54 projecting upwardly from a front end thereof. Housing 52 also includes relatively flat bottom and back end surfaces 55 and 57, respectively. The rising front face of housing 52 (including ridged ends 54), the flat top surface 53, and the back end surface 57 are preferably constructed as an integral housing unit. For convenience of assembly, bottom surface 55 is preferably fabricated as a separate housing unit. Therefore, the housing 52 and the actuator assembly 58 include a total of three component parts which are connected together to form the present hold device 50. Bottom surface 55 is assembled into housing 52 at a location between the rising front face thereof and the back end surface 57.

Figure 12:
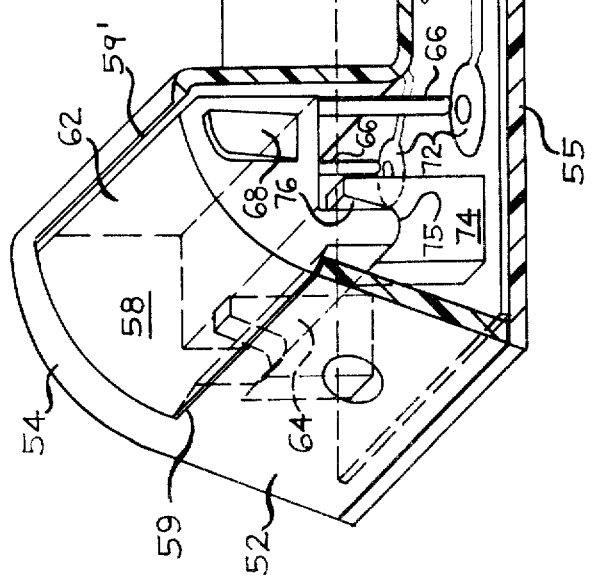
FIG. 12 is the schematic of a circuit of the instant hold device which, when energized, is adapted to place the telephone of FIGS. 7 and 8 in a hold condition.

The circuitry associated with telephone circuit hold device 50 is provided by means of conventional solid state components suitably interconnected with one another on a printed circuit board 70. Printed circuit board 70 is mounted flush against the flat bottom surface 55 of housing 52. Reference may be made to FIG. 12 for a schematic of the preferred circuitry on circuit board 70 whereby to place the Touch Tone telephone of FIGS. 7 and 8 in a hold condition.

A pair of well-known dome switches 72 are connected into the circuit formed on circuit board 70. As will be known to those skilled in the art, each dome switch 72 comprises a normally opened, single pole-single throw switch. A dome switch 72 is closed (for completing an associated circuit branch) by applying sufficient pressure to the domed surface thereof. Dome switches 72 are positioned on circuit board 70 so as to be alinged to receive within the domed surfaces thereof a respective back leg 66 of the actuator assembly 58 in the event that the telephone user depresses push bar surface 62. The particular interaction of the back legs 66 of actuator assembly 58 with dome switches 72 is best described when referring to FIG. 11.

A pair of generally rectangular pivot support posts 74 are mounted at the interior of housing 52 so as to extend upwardly from printed circuit board 70. The top of each pivot support post 74 is formed with an arcuate surface 75 having a coextensive inclined surface 76 angling outwardly from one end thereof. Pivot support posts 74 are suitably positioned behind the face of housing 52, whereby to receive at respective arcuate surfaces 75 thereof a section of the elongated flange member 64 of actuator assembly 58.

The modular telephone circuit hold device 50 of the present embodiment is connected to the cradle of a Touch Tone telephone by apparatus which is similar to that described above when referring to FIG. 2. However, and more particularly, a pair of clips 80 (only one of said clips being shown) is provided at the rear of housing 52 (opposite the location of ridged ends 54). Clips 80 are formed as extensions of the bottom surface 55 of housing 52. The configuration of each clip 80 comprises a pair of successively rounded surfaces which extend across the width thereof. One of the curved surfaces of clip 80 is dimensioned so as to be adapted to interlock with a correspondingly shaped bend or protrusion (e.g. 31 of FIG. 2) located on a ledge which forms a part of the telephone cradle. Thus, the housing 52 of the modular telephone circuit hold device 50 can be moved longitudinally into the cradle area of a Touch Tone telephone and removably connected thereto by means of clip 80. However, it is to be recognized that clip 80 may have a configuration which includes a rectangular groove extending across the width thereof, rather than a curved surface. The configuration of clip 80 is determined by the corresponding shape of the protrusion formed along the ledge of the telephone cradle to which the housing of hold device 50 is removably connected.

Figure 11:
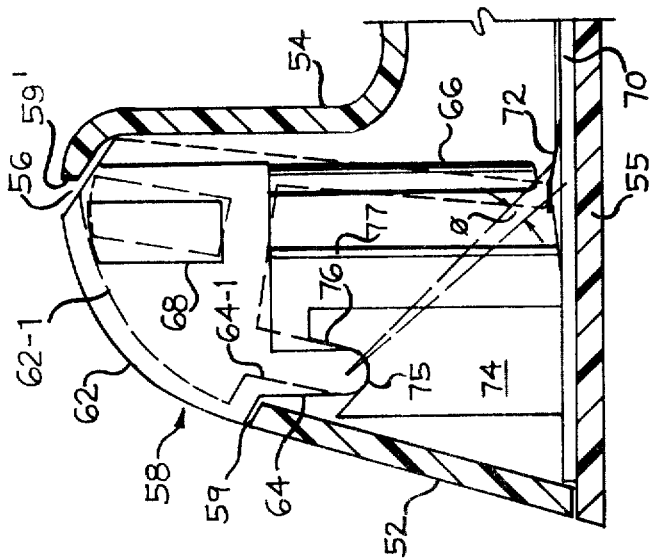
FIG. 11 is a detailed enlargement showing the structure and operation of the actuator assembly which forms the hold device of the present invention.

The operation of actuator assembly 58 of the present telephone circuit hold device 50 is best described when referring to FIG. 11 of the drawings. In order to place the telephone in a hold condition, the telephone user first depresses the curved push bar surface 62 of actuator assembly 58. The push bar surface assumes a depressed position which is shown in phantom and represented by reference numeral 62-1. Accordingly, the actuator assembly 58 is rotated or pivoted around the point at which actuator flange member 64 interfaces with the arcuate surface 75 of each pivot support post 74. That is, by depressing push bar surface 62, actuator assembly 58 rotates in a generally clockwise direction until the flange member 64 thereof is moved flush against the angled surfaces 76 of pivot support posts 74. The rotated position of actuator assembly flange member 64 against inclined surface 76 is shown in phantom and represented by reference numeral 64-1.

What is more, as actuator assembly 58 rides around the arcuate surfaces 75 of pivot support posts 74, both of actuator legs 66 are, correspondingly, rotated in a generally clockwise direction to a position shown in phantom and represented by the reference numeral 66-1. By way of example, actuator legs 66 are rotated through an angle, designated $\theta$ in the drawings, of approximately 7° relative to the respective pivot points formed at the arcuate surfaces 75 of support posts 74. Thus, each actuator assembly leg 66 is eventually moved into physical contact with the top of a respective dome switch 72. The downward pressure of legs 66 against the top of dome switches 72 is sufficient to depress dome switches 72 and, thereby, electrically complete the associated circuits in which switches 72 are connected. The closure of dome switches 72 and the return of the telephone handset to the telephone cradle ultimately causes the telephone to be rendered in a hold condition, whereby to energize a light emitting diode (not shown) in order to indicate to the telephone user that the telephone is in a hold condition. The technique by which dome switches 72 operate to electrically complete the hold circuit and energize a light emitting diode indicator is best described when referring to FIG. 12.

Stop member 68, which is rotated to a position shown in phantom and represented by the reference numeral 68-1, also functions to protect the dome switches 72 in the event that the telephone user exerts an overly excessive amount of force when depressing push bar surface 62 for moving actuator assembly legs 66 into contact with dome switches 72. That is, stop members 68 are suitably located on each side of the body of actuator assembly 58, so that the outwardly tapered ends thereof are adapted to contact the top lip 59' of housing 52. As previously disclosed, the top lip 59' forms one elongated, peripheral edge defining the rectangular opening 56 in the front of housing 52, from which opening 56 extends the push bar surface 62 of actuator assembly 58. The movement of stop member 68 against the top lip 59' limits the rotational movement of the actuator assembly legs 66, whereby to prevent the actuator assembly legs 66 from damaging (e.g. breaking through) the contact surface of dome switches 72.

FIG. 12 of the drawings is a schematic representing a preferred circuit whereby to enable a telephone user to place his Touch Tone telephone in a hold condition. The schematic of FIG. 12 is illustrative of those circuit components which are interconnected with one another at the printed circuit board 70 of FIG. 10. The circuit is briefly described as follows. One d.c. terminal of a conventional bridge rectifier 82 is connected to the anode electrode of the light emitting diode 60. By way of example, light emitting diode 60 may be manufactured by General Instrument Corporation and bear Part No. MV5753. The cathode electrode of light emitting diode 60 is connected at a common electrical junction with one end of each of a pair of current limiting resistors 84 and 86. Resistors 84 and 86 are connected in electrical parallel relative to one another. The second ends of each of current limiting resistors 84 and 86 are connected together at a common electrical junction with the cathode electrode of a Zener diode 88. The Zener diode utilized herein has a breakdown voltage of 13 volts d.c. By way of example, Zener diode 88 may be manufactured by Motorola Corporation and bear Part No. 1N4743. The anode electrode of Zener diode 88 is connected to a common electrical junction 90. One terminal of each of the dome switches 72 and the anode electrode of a silicon controlled rectifier 92 are connected together at the common electrical junction 90. By way of example, silicon controlled rectifier 92 may be manufactured by Motorola Corporation and bear Part No. 2N5064. The second terminals of each of the dome switches 72 are connected together at another common electrical junction 94.

Hence, as will be appreciated by those skilled in the art, dome switches 72 are connected in electrical parallel relative to one another. As was previously disclosed when referring to FIG. 11, when the telephone user depresses the push bar surface 62 of actuator assembly 58, each of the pair of actuator legs 66 is concurrently rotated or pivoted into contact with a respective dome switch 72, whereby to electrically close each of the dome switches 72. Therefore, the parallel arrangement of dome switches 72 with one another in the circuit of FIG. 12 forms a double pole-single throw switch that is interconnected between common electrical junctions 90 and 94.

A cathode gating electrode of silicon controlled rectifier 92 and one end of a biasing resistor 96 are also connected together at the common electrical junction 94. Biasing resistor 96 is utilized to control the gating voltage and, hence, the conductivity of silicon controlled rectifier 92. The second end of biasing resistor 96 and the cathode electrode of silicon controlled rectifier 92 are connected together at a common electrical junction with a second d.c. terminal of bridge rectifier 82.

First and second a.c. terminals of bridge rectifier 82 are connected to a well-known modular telephone plug 98. However, and in the alternative, it is to be understood that the first and second a.c. terminals of rectifier 82 may be connected to respective spade lugs 100 (shown dotted) in the event that the circuitry of FIG. 12 is to be hard wired during interconnection to the Touch Tone telephone of FIGS. 7 and 8. Modular telephone plug 98 may be inserted into a jack socket of a conventional telephone adapter (102 of FIG. 8). A modular telephone plug (not shown) that carries transmission signals from the telephone company's central office is inserted into a different jack socket of the telephone adapter. The aforementioned telephone adapter (102) is then installed in a suitable recepticle which is typically positioned at the rear of the telephone. Hence, the circuitry of the instant telephone hold device can be interfaced at adapter 102 with the transmission signals supplied from the telephone company's central office in order to place the telephone in a hold condition without disconnecting an existing telephone call.

The operation of the circuit illustrated in FIG. 12 and the technique by which a user can place his Touch Tone telephone in a hold condition are now described while referring concurrently to FIGS. 11 and 12. Initially, during the time that the telephone user is communicating with an existing caller, the line voltage between the d.c. terminals of bridge rectifier 82 is approximately 5 volts. Should the telephone user wish to activate the circuitry of FIG. 12, whereby to place his telephone in a hold condition, the push bar surface 62 of actuator assembly 58 is depressed. As was previously disclosed, depressing push bar surface 62 results in the closure of dome switches 72 by receipt thereagainst of the actuator legs 66. While push bar surface 62 is being held in a depressed position, the telephone user returns the handset to the telephone cradle, whereby to depress telephone plungers 15, 15' (of FIG. 8). Accordingly, with plungers 15, 15' depressed, the voltage across the d.c. output terminals of bridge rectifier 82 begins to rise towards an idle line voltage of approximately 48 volts. When the d.c. voltage reaches 13 volts, Zener diode 88 becomes forward biased and is, thereby, rendered conducting. Moreover, sufficient voltage is applied to the cathode gating electrode of silicon controlled rectifier 92. Silicon controlled rectifier 92 becomes forward biased and is, thereby, also rendered conducting, so as to complete a suitable d.c. current path by which to energize and illuminate light emitting diode 60. The d.c. current path established during the conduction of silicon controlled rectifier 92 short circuits the telephone circuits to thereby cause the telephone to assume a hold condition.

The user may then release the actuator assembly push bar 62 from its depressed position. A resilient, generally U-shaped spring member 77 may be connected between the underside of actuator assembly 58 and the housing bottom surface 55, so as to provide biasing means for returning assembly 58 to its unrotated position. Accordingly, the actuator assembly 58 rotates in a counterclockwise direction, so that actuator legs 66 are moved out of contact with respective dome switches 72. Although dome switches 72 return to their normally open circuited condition, whereby to break the circuit connection between common electrical junctions 90 and 94, the d.c. current path established through silicon controlled rectifier 92 is sufficient to short circuit current around switches 72 and resistor 96 in order to continue the energization of light emitting diode 60. While the telephone circuits are in the hold condition, the voltage across the d.c. terminals of bridge rectifier 82 will rise to approximately 15 to 20 volts.

When the telephone user reaches the location of an extension telephone or, in the alternative; should he desire to again talk to the existing caller on the same telephone, the user merely picks up the corresponding handset. Thereafter, the voltage across the d.c. terminals of bridge rectifier 82 will drop towards 5 volts (the operating line voltage). As the voltage drops below 13 volts, Zener diode 88 becomes back biased and is rendered non-conducting. Silicon controlled rectifier 92 is also rendered non-conducting, because of a lack of sufficient gating voltage. Moreover, light emitting diode 60 becomes de-energized and the illumination thereof (formerly indicating a hold condition) is extinguished. Hence, the telephone user may now conveniently continue his conversation from any desirable telephone location.

By virtue of the foregoing invention, a telephone user may quickly and conveniently place his telephone in a hold condition, whereby to preserve an existing call until the user is ready to resume the conversation. The user need only use a single hand to depress actuator assembly 58 and return the handset 51 to cradle 14 whereby to energize the circuitry of the instant hold device 50. The modular construction of hold device 50 adapts said device to be releasably connected to the cradle area of the telephone, so as to conserve space and provide the user with an easily visible indication of the status of the telephone circuits.

It will be apparent that while a preferred embodiment of the invention has been shown and described, various modifications and changes may be made without departing from the true spirit and scope thereof. For example, although in a preferred embodiment of the invention the modular hold device 50 is attached to the cradle area of a telephone, this is not to be regarded as a limitation of the present invention. It is to be understood that hold device 50 could be interfaced with a telephone at any other suitable location (e.g. in front of the cradle or at the side of the telephone housing).

Having thus set forth the preferred embodiment of the invention, what is claimed is:

1. For a telephone having a handset and a cradle, said cradle including pairs of projections respectively formed and disposed at opposite sides thereof and a ledge formed between said oppositely disposed pairs of projections, a device to be attached at said telephone cradle for receiving the telephone handset and for controlling the telephone circuits, said device comprising:
    a housing having a top and a bottom,
    the bottom of said housing being positioned adjacent said cradle ledge,
    the top of said housing having an arcuate ridge extending completely across a first end thereof, said arcuate ridge being aligned with and positioned between two of the projections of the said pairs so as to extend the outline of said two projections across a corresponding first end of said cradle,
    circuit means located within said housing and electrically connected to the circuits of the telephone to control the operation thereof,
    switching means located within said housing for controlling the energization of said circuit means,
    actuator means located within said housing and extending through the arcuate ridge at the top of said housing, said actuator means having a pivotable member thereof, and
    pivot support means located within said housing to interface with the pivotable member of said actuator means, so that said actuator means can be pivoted at said pivot support means and rotated into physical contact with said switching means in order to operate said switching means and thereby control the energization of said circuit means.

2. The telephone control device recited in claim 1, wherein said actuator means further includes at least one leg member projecting outwardly therefrom,
    said leg member being particularly aligned with said switching means so as to be moved into physical contact with said switching means when said actuator means is pivoted at said pivot support means.

3. The telephone control device recited in claim 2, wherein said switching means comprises at least one dome switch electrically connected into said circuit means,
    said dome switch positioned within said housing so as to be able to receive said actuator means leg member within a domed portion thereof, whereby to close said dome switch and thereby control the energization of said circuit means.

4. The telephone control device recited in claim 1, wherein the pivotable member of said actuator means comprises a flange projecting outwardly therefrom,
    said flange having an end that is pivotably received at a pivot surface of said pivot support means so that said actuator means can be pivoted thereon.

5. The telephone control device recited in claim 4, wherein said pivot support means has an arcuate pivot surface formed thereon for pivotably receiving the end of said actuator means flange,
    said arcuate surface having an elongated extension at one end thereof for receiving said flange thereagainst when the end of said flange is pivoted on said arcuate surface.

6. The telephone control device recited in claim 1, wherein said housing has an opening established through the arcuate ridge thereof,
    a portion of said actuator means extending through said opening and conforming to the contour of said arcuate ridge at the first end of said telephone cradle,
    said actuator means portion being rotatable, so that said actuator means can be pivoted into physical contact with said switching means.

7. The telephone control device recited in claim 1, wherein said circuit means includes an indicating means electrically connected therein, said indicating means being activated when said actuator means is rotated and said circuit means is energized.

8. The telephone control device recited in claim 7, wherein said indicating means comprises a light emitting diode,
said light emitting diode extending through an aperture formed in the top of said housing, so as to provide a luminous signal that is indicative of the energization of said circuit means.

9. The telephone control device recited in claim 1, including at least one stop member protruding outwardly from said actuator means adjacent said housing, said stop member adaped to come in contact with said housing when the position of said actuator means is changed within said housing,
said stop member acting to retain said actuator means within said housing and to limit the rotational movement of said actuator means.

10. The telephone control device recited in claim 1, including a spring means interfaced with said actuator means for controlling the rotational movement of said actuator means.

11. The telephone control device recited in claim 1, wherein said housing includes means for removably attaching said device to the cradle of said telephone.

12. The telephone control device recited in claim 1, wherein said circuit means includes circuit components that are interconnected with the telephone circuits in order to place the telephone circuits in a hold condition, whereby the telephone handset may be returned to its cradle without disconnecting an existing caller.

* * * * *